(12) United States Patent
Hartsook et al.

(10) Patent No.: US 9,304,980 B1
(45) Date of Patent: Apr. 5, 2016

(54) IDENTIFYING VERSIONS OF FILE SETS ON A COMPUTER SYSTEM

(75) Inventors: Lawrence Douglas Hartsook, Milpitas, CA (US); Robert Kenneth Smith, Sunnyvale, CA (US)

(73) Assignee: Palamida, Inc., San Francisco, CA (US)

(*) Notice: Subject to any disclaimer, the term of this patent is extended or adjusted under 35 U.S.C. 154(b) by 1484 days.

(21) Appl. No.: 12/252,326

(22) Filed: Oct. 15, 2008

Related U.S. Application Data

(60) Provisional application No. 60/980,037, filed on Oct. 15, 2007.

(51) Int. Cl.
*G06F 17/22* (2006.01)
*G06F 17/30* (2006.01)

(52) U.S. Cl.
CPC ...... *G06F 17/2288* (2013.01); *G06F 17/30309* (2013.01)

(58) Field of Classification Search
None
See application file for complete search history.

(56) References Cited

U.S. PATENT DOCUMENTS

| | | | |
|---|---|---|---|
| 6,493,871 B1* | 12/2002 | McGuire et al. | 717/173 |
| 7,529,778 B1* | 5/2009 | Dewey et al. | |
| 7,565,348 B1 | 7/2009 | Waldin et al. | |
| 7,711,719 B1 | 5/2010 | Waldin et al. | |
| 2003/0182652 A1* | 9/2003 | Custodio | 717/122 |
| 2004/0088581 A1* | 5/2004 | Brawn et al. | 709/224 |
| 2004/0215755 A1* | 10/2004 | O'Neill | 709/223 |
| 2005/0055686 A1* | 3/2005 | Buban et al. | 717/170 |
| 2006/0212464 A1* | 9/2006 | Pedersen | 707/101 |
| 2008/0196008 A1* | 8/2008 | Branton et al. | 717/120 |

* cited by examiner

*Primary Examiner* — Jau-Shya Meng
(74) *Attorney, Agent, or Firm* — Fenwick & West LLP

(57) ABSTRACT

Target files in a search space are scanned to identify which versions of software components are present in the search space. A reference library is populated with indicia such as source code fragments of known versions of software components. A file scanner reads file data used to identify matches between the reference library content and target files, and a version detector determines which match candidates represent unique component versions. Once a component version is identified, a vulnerability module determines based on data in a vulnerabilities database what vulnerabilities are associated with the identified version, and a license module identifies which if any licensing schemes are applicable to the identified version. In one embodiment a report is automatically produced providing an indication of all matched files, their versions, vulnerabilities, and licensing schemes.

19 Claims, 5 Drawing Sheets

IDENTIFYING VERSIONS OF FILE SETS ON A COMPUTER SYSTEM

CROSS REFERENCE TO RELATED APPLICATIONS

This application claims the benefit of U.S. Provisional application 60/980,037, filed Oct. 15, 2007 and incorporated by reference herein in its entirety

BACKGROUND

1. Field of the Invention

The present invention is directed generally to identification of software components. In particular, the present invention enables the identification of the versions of software components present on a computer system, and subsequently identifies associated vulnerabilities and licenses.

2. Description of the Related Art

A software component is an open-source software project or commercial software package that can be installed in whole or in part on a computer system. Some well-known examples of software components include the Apache Tomcat server, by the Apache Software Foundation; Microsoft Word, by Microsoft; and Firefox, by Mozilla. Typically, over time, updates are made to software components, and new versions are released. For example, at present, the current version of Mozilla's Firefox is release 3.0.3. A particular release may comprise any combination of original code and other software components. Each of these contained components is in itself a particular release version of that component, and each of these may in turn also contain other components. This nested containment can go on to multiple levels of depth. Additionally, especially if needed by more than one other component, a given component may be included via runtime link references, rather than by being strictly nested.

Software components, of both the open-source and commercial varieties, have accompanying licenses that govern how the software component may be used by others. These licenses may vary between different versions of a similar component. In addition, different versions of software components may be subject to certain known vulnerabilities. Identifying actual versions of software components in use is therefore important in assessing vulnerability of a product as well as for complying with open-source and other licensing requirements.

SUMMARY

The present invention enables scanning of target files in a search space to identify which versions of software components are present in the search space. A reference library is populated with indicia such as source code fragments of known versions of software components. A file scanner reads file data used to identify matches between the reference library content and target files, and a version detector determines which match candidates represent unique component versions. Once a component version is identified, a vulnerability module determines based on data in a vulnerabilities database what vulnerabilities are associated with the identified version, and a license module identifies which if any licensing schemes are applicable to the identified version. In one embodiment a report is automatically produced providing an indication of all matched files, their versions, vulnerabilities, and licensing schemes.

The figures depict various embodiments of the present invention for purposes of illustration only. One skilled in the art will readily recognize from the following discussion that alternative embodiments of the instructions and methods illustrated herein may be employed without departing from the principles of the invention described here.

DETAILED DESCRIPTION OF THE PREFERRED EMBODIMENTS

Figure 1:
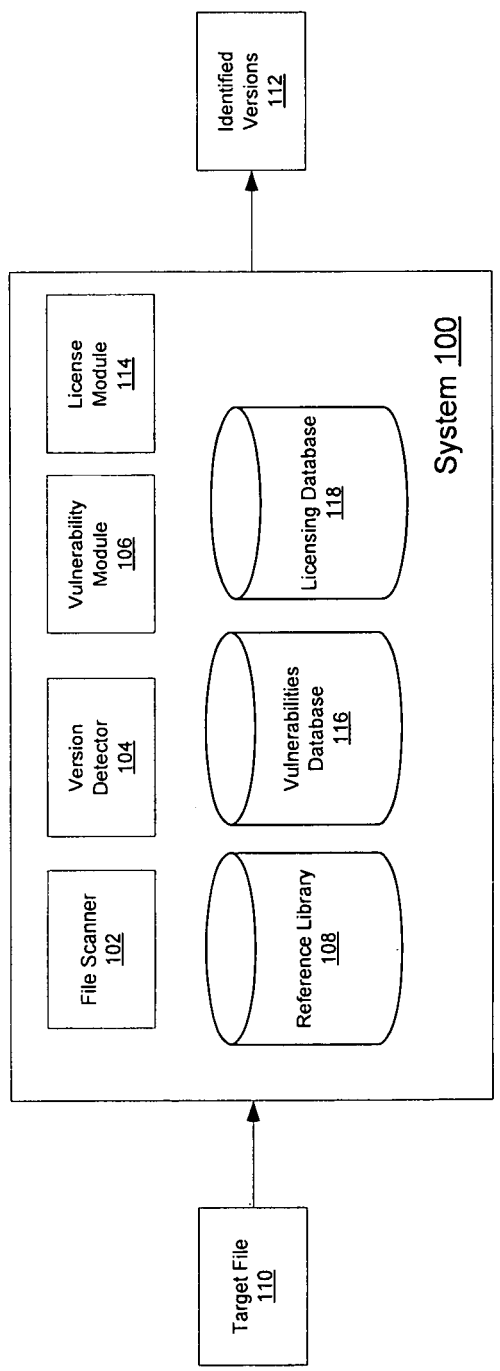
FIG. 1 is a block diagram of a system for identifying software version on a file system in accordance with an embodiment of the present invention.

FIG. 1 illustrates a system 100 for identifying software versions on a file system and associated vulnerabilities and licensing requirements in accordance with an embodiment of the present invention. System 100 includes a file scanner 102, version detector 104, a vulnerability module 106, reference library 108, license module 114 vulnerabilities database 116 and licensing database 118. Also shown in FIG. 1 are target file 110 and identified versions 112. Each of these components is described further below. Note that although target file 110 is illustrated as a singular file, this is merely for purposes of illustration; in practice multiple target files can be analyzed by system 100. In addition, although illustrated as separate logical modules, the functional components of system 100 may be distributed among one or more computer systems and components, as will be appreciated by those of skill in the art.

Target files 110 are those source code, executable code, documentation, image, data, and any other kinds of files that are to be scanned to identify versions and associated vulnerabilities. File scanner 102 reads target files, determines content-based identifiers for the target files 110, and passes these identifiers to version detector 104. In one embodiment, the content-based identifiers are MD5 digests; in alternative embodiments, others can be used, including graphs of file layouts, statistic sampling of file content, or code snippet fingerprinting. Version detector 104 matches these identifiers against data from reference library 108. Reference library 108 includes identifiers for each item of reference content to be searched for. The matching performed by version detector 104 results in a set of candidate component-versions. This set may be larger than the total number of actual matches due to containment and false matches. Version detector 104 prunes the set of candidates, excluding those items that fail to meet thresholds or are otherwise determined to not be necessary or correct. Vulnerability module 106 associates vulnerabilities to versions of components as specified in vulnerability database 116.

As noted above, a component is an open-source software project or commercial software package that can be installed in whole or in part on a computer system. In the context of version detection, a component describes a set of one or more computer files having one or more versions of interest.

While there is no industry-wide standardized format or naming convention for software versions, conceptually each software component has a kind of a fully qualified name of the following type: "Name-Version-Release" where Name is the "product name", such as "Firefox", Version is the usually but not necessarily numeric major, minor, and sometimes subminor identifier for the code base in general, such as "3.0.3", and Release is an indicator of a platform-specific or other important characteristic of the code, such as "Windows" or "source code only". The intent of this non-standardized fully qualified name is to uniquely identify one or more files that collectively comprise the software component named, or the related artifact, such as "MyProject-4.2.beta-documentation". This named thing is typically but not necessarily a computer file archive—that is, a single file that has been made to contain all the files that actually are the thing being released. These constituent files can be copied out of the archive for use, and in some cases, as with class and/or resource files in Java JAR files, can be used directly from within the archive without an explicit extraction step. A released version of a component is typically made available by way of one or more release archives as just described. For example, a release may be a compressed set of files such as a zip file, or tar or jar or cab or other type of archive file. There is little standardization among projects with respect to how release archives are structured, so there may be different archives for source versus pre-compiled forms, or for documentation versus actual software, and so on, or everything may be included in a single archive. Releases are made available for download and/or distributed via media such as compact discs and DVDs.

A particular version of a particular component, either included in a broader release or distributed on its own is referred to as a component-version. As indicated above, a component-version can contain other component-versions. For example, a Component A, version 3.7, might include a copy of Component B, version 1.2. This is called containment.

A collection of the component-versions that can be searched for, in both release and non-release forms is known as a reference library. A reference library such as reference library 108 is typically compiled or acquired before any searches begin.

A search space contains the file systems that are searched to locate instances of the component-versions catalogued in reference library 108. Target files 110 in a given search space may contain several searched-for component-versions, as well as some material that by coincidence matches parts of component-versions without being an actual copy, as well as considerable material that is entirely disjoint from reference library 108. Thus, in one embodiment, the search space analysis is categorized into true matches, false matches, and non-matches. A search of the search space for items in reference library 108 is a many-to-many search—that is, many items in the search space may match many items in the reference library.

Containment aside, due to chance a portion of distinct component-versions might coincidentally be identical even though neither is a copy of the other, nor or of any common original source. This becomes increasingly likely as the size of what is being compared decreases. For example, in comparing two files in their entirety, a high degree of homology would tend to imply copying, but in comparing only a series of 100 characters within each file, there may be many cases where the same string recurs without having been copied.

In one embodiment, source code fragments found in a source code target file 110 are identified using a source code fingerprint. Reference library 108 contains a collection of unique source code fragments that are used to identify the origin of the code fragment. Identifying the origin of a source code fragment using fingerprints is described in further detail in U.S. patent application Ser. No. 11/277,484 entitled "Massive Multi-Pattern Searching," incorporated by reference herein in its entirety.

In one embodiment, version detector 104 can be configured to search for varying levels of evidence of detail, numbers of components, and versions; and can be configured to use certain detection techniques and confidence levels with which it identifies particular versions of components, as will be appreciated by those of skill in the art.

A particular version of a component running on a computer system may be susceptible to malicious code or input that can be used to compromise or harm the functioning, security, access to, availability of or data on the computer system or connected network. This is known as a vulnerability. Vulnerabilities database 116 includes data about vulnerabilities known to be associated with specific versions of software components. Once version detector 104 has created an inventory of component-versions installed on a computer system, i.e. present in target files 110, vulnerability module 106 matches the located versions to known vulnerabilities present in vulnerabilities database 116.

In addition to associating security vulnerabilities with versions of software components, other metadata can be associated with versioned sets of computer files. Software licenses are another instance of this concept, and in one embodiment once a certain version of a software component has been located, license module 116 compares the software component version against licensing database 118 to determine which, if any, policies are associated with the software version. Other metadata regarding a version such as popularity in actual use, names of authors, how actively the project is being worked on, and many other bits of relevant information about the component are also tracked in alternative embodiments.

Figure 2:
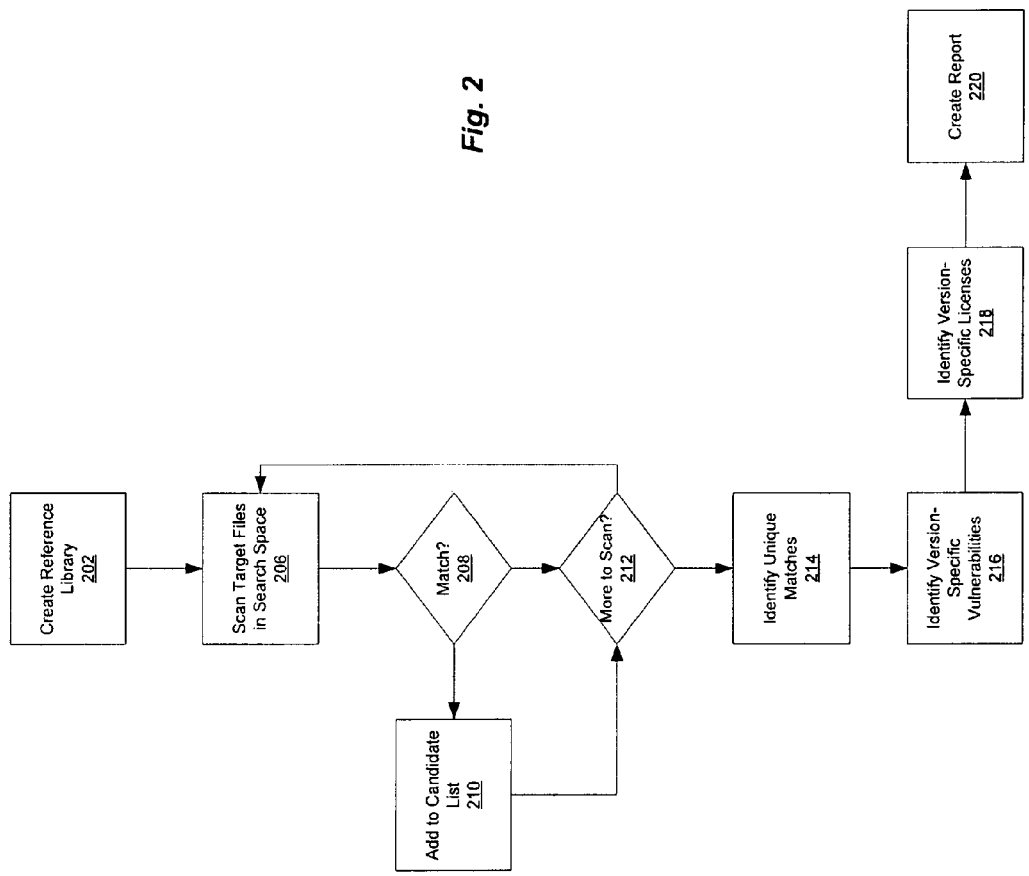
FIG. 2 is a flowchart illustrating a method for performing version detection in accordance with an embodiment of the present invention.

FIG. 2 illustrates a method for performing version detection in accordance with an embodiment of the present invention. To begin, a reference library 108 is created 202 or acquired. Reference library 108 associates files to releases, versions and components using fingerprints, MD5 hashes and other detection data as described above. One database suitable as a reference library is the suite of Palamida Compliance Libraries available from Palamida, Inc. of San Francisco, Calif. In one embodiment, reference library 108 contains all known components and versions; in an alternative embodiment, reference library 108 is reduced to include only a subset of reference components and versions, which serves to reduce the complexity and time required for analysis of target files, i.e. by only attempting to identify components and versions actually of interest.

The content of the reference library may be "raw" (that is as already described) and or "pre-digested" into subsets or expanded with additional associations or additionally indexed, to optimize the search process or subsequent processing such as removal of false positives, detection of hard-to-find components, and associations with meta-data of interest such as vulnerabilities and licenses. In one embodiment, reference library 108 optimizes version identification by determining which files in reference library 104 are unique to a release, version or component. In one embodiment, file-to-release, file-to-component, and file-to-version mappings are inserted into a relational database of reference library 108. A query that groups—tuples by file and selects those with a cardinality of one will return files that are candidates for uniquely identifying a release. Determining the files unique to a release is most effectively accomplished by a query that extracts those files that reference only the same version and are not in the previously calculated set of files that uniquely identify releases. The same type of query, restricted by component instead of version, will select the files that are unique to a component.

Note that if this process is performed against a subset of the full reference library, the candidate unique file indicators will have to be further checked against the full reference library. Files that are not unique when compared to the full reference library do not uniquely identify a version or component. For example, when computing unique file indicators from a restricted reference library, an image file may appear as though it is only associated with one particular component. However, this file may be extremely common when viewed in the context of the entire reference library. It therefore is not truly component-specific and should be excluded from the set of files used to uniquely identify a component. Similarly, unique class/package names in the Java programming language can be mapped to release, version and component mappings.

Although in FIG. 1 only one version detector 104 is illustrated, many may be used in practice. By default all detectors are used, e.g., fingerprint detection, MD5 detection, Java class/package detection, and so on, but if the user has specific knowledge about the computer system to be scanned and finds some detectors irrelevant to the particular search space, the user may decide to disable one or more detectors to reduce the processing time and amount of data generated.

File scanner 102 scans 206 a target file 110, and version detector 104 attempts to determine a version of the scanned target file 110 by matching the contents of the file or a digest of the file against reference data in reference library 108. If 208 a match exists between the scanned target file 110 and the reference data, then any versions in the reference data including the matched fragment are added 210 to a candidate list. This process continues until 212 there are no more files to scan.

Version detector 104 next attempts to identify 214 which of the candidate versions are actual matches as described in more detail below. When a match uniquely indicates a specific release, version detector 104 records the associated version and component along with the release. When a match uniquely indicates a specific version, the component that is associated with the version and all related releases are recorded. Similarly, if the match is against a component, all versions and all releases of all versions of that component are recorded.

Alternatively, if the digest matches an item of reference content, but that reference content has not been determined to uniquely identify a version, then in one embodiment version detector 104 adds the match information to a report of non-unique matches. In alternative embodiments, only unique matches are reported.

In one embodiment, when version detector 104 recognizes a version match, it adds only the subordinate releases that are known to contain the current file. In an alternative embodiment, version detector 104 adds all of the releases, and pares them down in a subsequent pass over the candidate releases, versions and components as illustrated below with respect to FIG. 3, FIG. 4 and FIG. 5. Version detector 104 in one embodiment similarly treats a component match by adding all subordinate versions and releases and paring them down at a later time.

Once all of the target files 110 in the search space have been processed as described above, version detector 104 has compiled a set of candidate components, versions and releases. If the techniques applied so far tend to include significant numbers of false positive or other incorrect results, it may be most practical to improve those techniques and at other times be more efficient to take their results as approximate and subject them to further processing at this point. That further processing in one embodiment is based on this intermediate data instead of the original data, and looks for patterns within the intermediate results or associations between that data and either the original data or the reference library data or both, or even another source of data. Since the most likely errors, or at least the most likely detectable and correctable errors, are positives, the mostly likely net outcome of this step is a reduction of items in the result set. For that reason this step can be described as "pruning away" false positives. In practice it may also improve detection of hard-to-find items and so be additive in whole or in part rather than being strictly subtractive. The pruning case is most likely, and is illustrated below.

Figure 3:
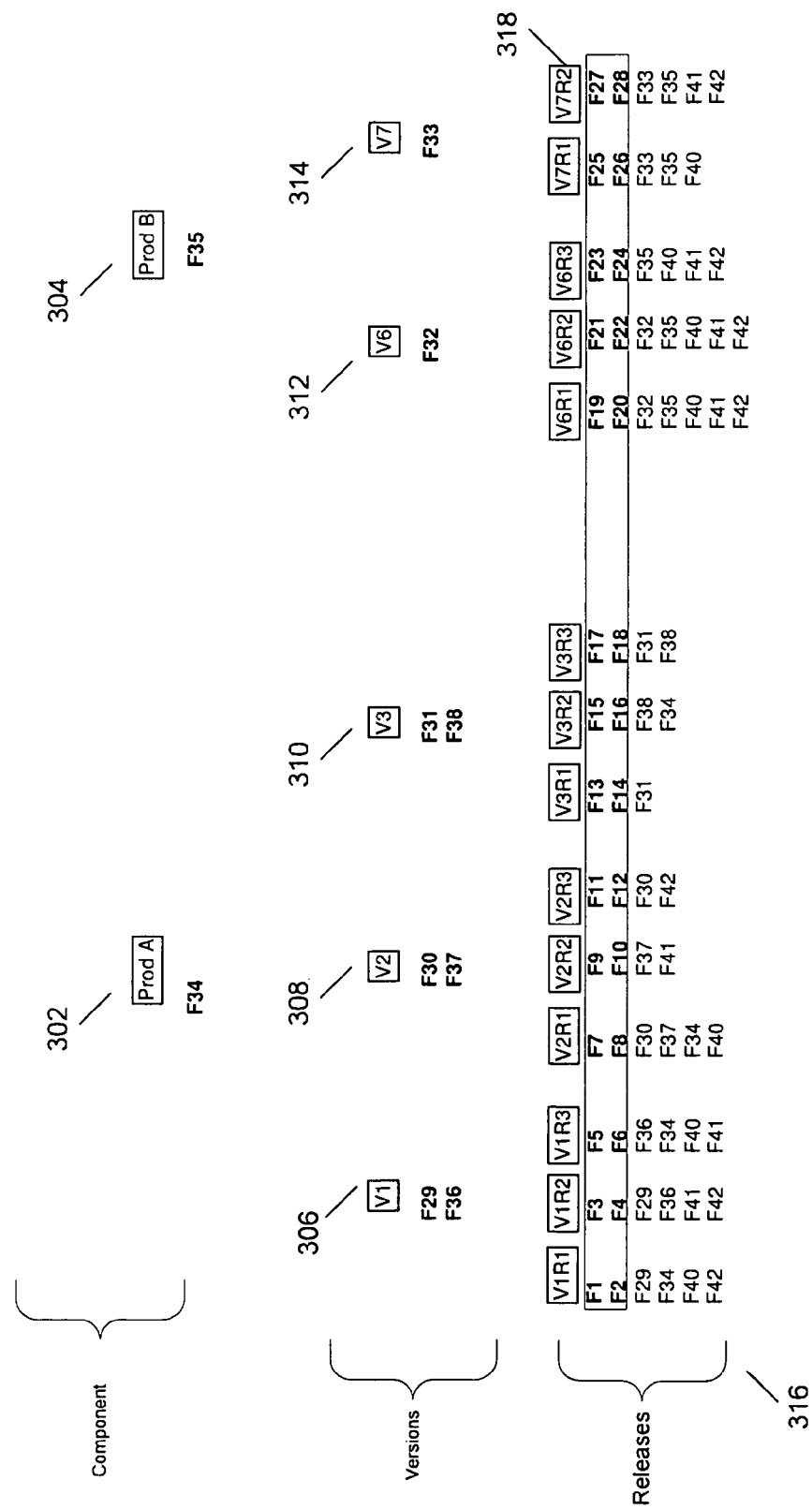
FIG. 3 illustrates a representation of data stored by a reference library at the release, version and component level in accordance with an embodiment of the present invention.
Figure 4:
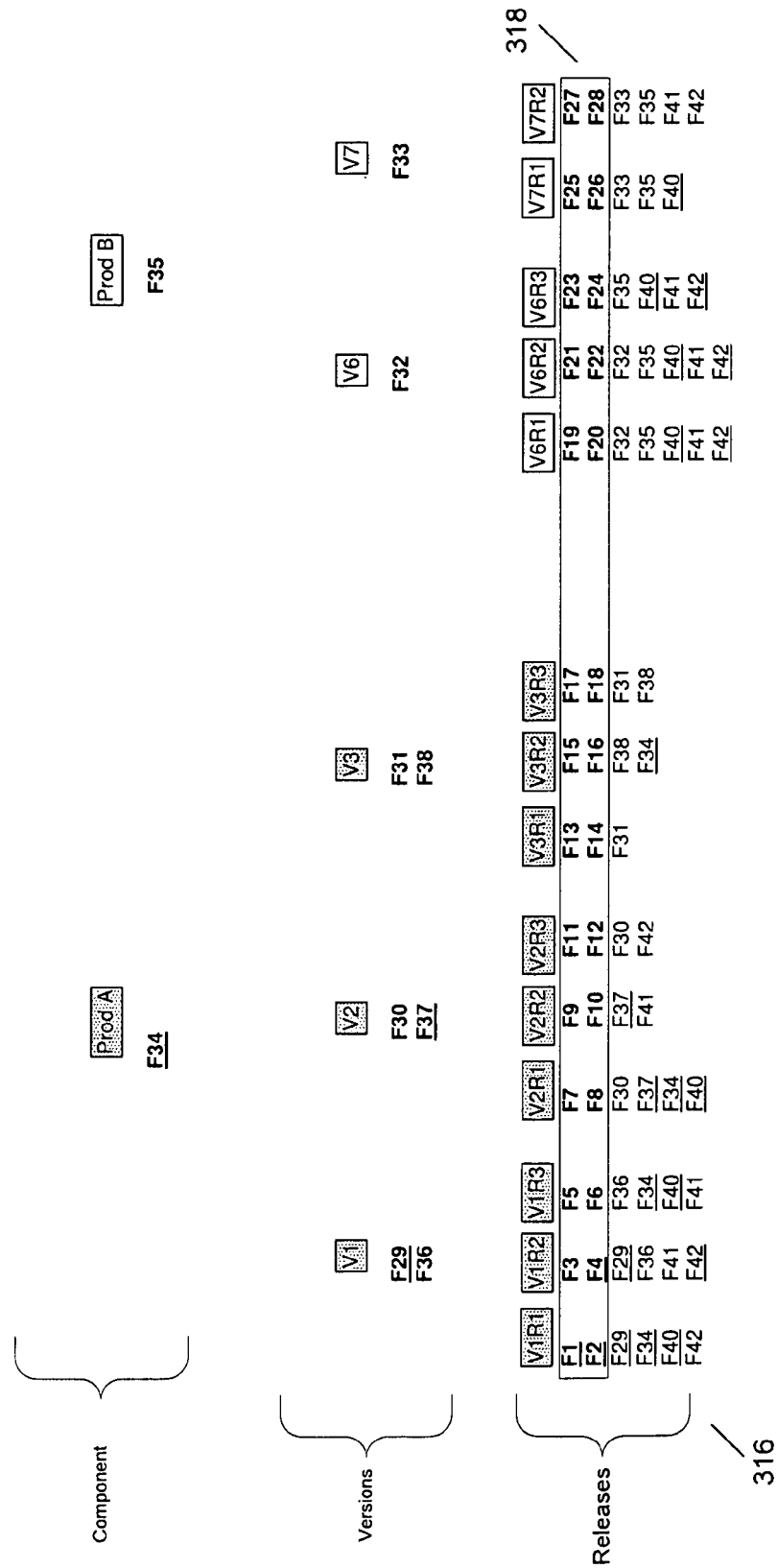
FIG. 4 illustrates a set of candidate releases, versions and components found by a version detector in accordance with an embodiment of the present invention.
Figure 5:
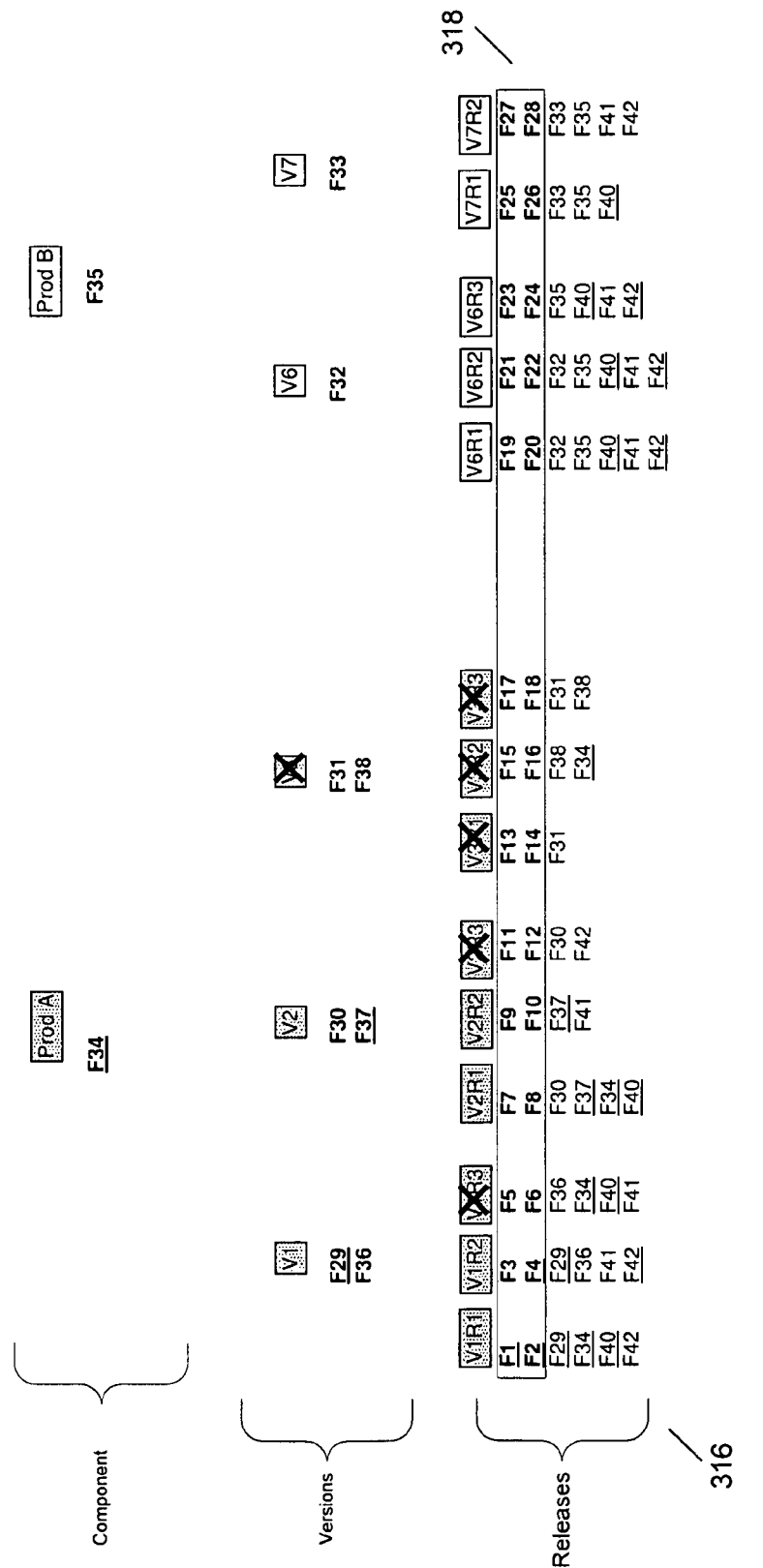
FIG. 5 illustrates the pruning of a candidate result list in accordance with an embodiment of the present invention.

FIGS. 3, 4 and 5 illustrate how version detector 104 derives and then prunes a set of candidates in accordance with an embodiment of the present invention. FIG. 3 shows a representation of data stored by reference library 108 at the release, version and component level. There are two components, Product A 302 and Product B 304, five versions V1 306, V2 308, and V3 310 for Product A, V6 312 and V7 314 for Product B, and several releases 316. The files contained in a release are listed below the release. Files that are unique to that release are grouped in the first two rows of the illustration, region 318. The files that are unique only at the version- or component-level are listed below the appropriate version or component so that it is clear which files are unique at which level. For example, file F34 is unique at the component level (indicating the presence of Product A), while file F38 is unique at the version level, indicating the presence of version V3 of product A. File F18 is unique at the release level, indicating the presence of release V3R3 of version V3 of product A. Also in this example, three files—F40, F41 and F42—appear under multiple versions of both Product A and Product B, and are thus not unique to any release or version of either.

Assume that files F1, F2, F4, F29, F34, F37, F40 and F42 are identified by version detector 104 during a scan of the search space. FIG. 4 shows the initial set of candidate releases, versions and components version detector 104 will find. The candidates are the products, versions and releases containing the identified files (shown in FIG. 4 in shaded boxes). The files that are digest matched against reference database 108 are underlined. Note that no releases or versions of Product B are candidates, even though files F40 and F42 are known to be associated with Product B. This is because there were no digest matches to any files that are uniquely associated to either Product B, its versions or releases.

The candidate set illustrated in FIG. 4 includes more candidate releases and versions than are actually present in the search space. This over-inclusive set is constructed when version detector 104 finds a unique match between file F34 and Product A, and as a result adds all versions and releases associated with Product A to its list of candidates.

FIG. 5 illustrates the pruning of the candidate result list in accordance with an embodiment of the present invention. Note in FIG. 5 that based on data in reference library 108, the files unique to the specific releases V3R1, V3R2 and V3R3 are F13, F14, F15, F16, F17 and F18. The files unique to version V3 are F31 and F38. Because none of these files was encountered by version detector 104, version detector 104 is able to eliminate version V3 from the candidate list. Similarly, releases V1R3 and V2R3 can also be discarded. Release V1R3 is discarded because none of its unique matches were found and the non-unique matches on F34 and F40 can be explained by the existence of V1R1. Release V2R3 is discarded because none of the files associated with it were seen. Releases V2R1 and V2R2 stay in the candidate set because they are the only possible explanations for the version-unique match of F37. Thus, the pruned candidate list contains Product A, Version 1-Release 1; Version 1-Release 2; Version 2-Release 1 and Version 2-Release 2. All other original potential candidates have been excluded.

Sometimes actual release files are encountered by version detector 104 during a scan (e.g., jboss-4.0.tar.gz). In one embodiment, version detector 104 uses a digest as a key to look up matching files in reference library 108. If a matching file is found and that file turns out to be a release file, a match for the corresponding release is recorded.

Source code files often contain modifications from the original that prevent matching by file digest. Source code fingerprinting can be used to identify those remaining source code fragments that are specific to a third party component, version or release. These "fragments" may be just several bytes in length or may comprise almost the entirety of the file. A source code fingerprint detection module of version detector 104 looks up the source fragment matches in reference library 108 and evaluates the uniqueness of each source fragment against each potential component, version and release. The existence of a unique, matching source code fingerprint to a distinct release or version as well as collections of such partial matches can be used to associate the entire file to a specific component, version or release. The matches that are identified by source code fingerprint detection can be used as an additional piece of evidence for the composite detector as described below.

A release coverage detector module of version detector 104 also keys off digest matches. For each identified match, it looks up the releases that contain the matched file and records the digest match for each release. For each release identified in this fashion, the detector counts a number of distinct digests associated with the release. After all of the digest matches have been processed, the detector calculates the ratio of actual digest matches to possible matches. This is the coverage ratio. In one embodiment, releases whose coverage ratio does not meet a threshold are discarded. This pruning eliminates unlikely releases.

This process need not be restricted to digest matching. It can be applied, for example, on the basis of fingerprint matching or other criteria. Additionally, this process need not be one-criterion-specific. It may be performed on the basis of a mixture of digest matches, fingerprint matches, and or other types of detection evidence.

A directory structure detector module of version detector 104 analyzes how well the directory structure of a release is matched by the scanned target files. In one embodiment, a massive multi-pattern search algorithm is used to compare paths of scanned files against the path structures of releases in the file system. After the scan is complete, the detector computes a coverage ratio for each release that had path matches. The coverage ratio is:

$(\Sigma(Line_i \text{ match length}/Line_i \text{ length}))/\# \text{ lines}.$

This yields a value between 0.0 and 1.0. Releases whose coverage ratio does not exceed a minimum threshold are discarded. This is necessary to eliminate unlikely releases. In one embodiment the threshold is set to different values for different purposes. For example, for routine use, the threshold might be set to a relatively high value such as 0.8, so that only fairly likely matches occupy the time of a human analyst responding to the report while in the case of a legal action based on a claim of copyright infringement or other case justifying investigation of more subtle evidence, a very low threshold might be set.

A composite detector module of version detector 104 collects the detection evidence from the individual detectors for a given release, version or component match. One way of implementing the composite detector is to have it scan through the files, and pass the files one at a time to the various subordinate detectors. This makes it possible to for the composite detector to obviate performing the remainder of the version detection process as soon as a specific detector makes a definitive enough assertion about a file that continued processing by others would not yield useful results. In one embodiment, the subordinate detectors are ordered so that the most definitive ones are run first, or they may work in an interleaved fashion through subsets of information significantly smaller than whole releases. Regardless of whether the process is terminated early, the subordinate detectors all operate on a common, shared set of candidate releases, versions and components.

In an alternative embodiment, the composite detector runs each subordinate detector entirely independent of the others, generating N sets of candidate releases, versions and components for the N subordinate detectors. The composite detector then has the responsibility of coordinating the merging of data from the independent sets into a single set containing all of the evidence. In one embodiment, the detectors operate on independent sets of candidate releases, versions and components. For example, the pruning done by the version detector would be more difficult if it could not simply delete releases or versions that are not required to explain the files seen during the scan.

Vulnerability association 216 (FIG. 2) is performed by vulnerability module 106 on a set of candidate versions. This is because vulnerability definitions, from the National Vulnerability Database (NVD) for example, are linked to versions, not simply to components. The same vulnerability may exist in multiple versions of a component, and is unlikely to exist in all versions—at some point it is introduced and at some point it gets fixed. The NVD may enumerate the versions, or it may specify them via a range (e.g., versions 1.4 through 2.2) or it may specify them via an inequality (e.g., all versions <5.5), or a mixed enumeration such as "<2.3, 3.1-3.4, 4.2"

In one embodiment, information from sources like the NVD is collected and the data is normalized into a Vulnerability Data Library (VDL), which is an example of vulnerabilities database 116. The VDL is a version of a Palamida Reference library that contains vulnerability-to-version mapping data in addition to release-, version- and component-identification data. Generating the vulnerability mapping data in the VDL requires normalizing the names of components and versions in sources like the NVD to the canonical names used in VDL. Some of this has to be accomplished through manual effort, however certain automated techniques can be employed to minimize the manual effort. Case-insensitive name comparison handles many matches. If that fails, vulnerability module 106 attempts various levels of fuzzy matching, e.g., ignoring prefixes and suffixes, ignoring white space and punctuation. Vulnerability module 106 applies these rules to obtain confidence scores for various matches. Human editors can use the confidence scores and possible matches to quickly decide whether to accept the system's proposed match or discard it in favor of another. When an editor ignores the system's proposed match, he has the option to indicate whether the system should add the decision to its knowledgebase so it will automatically make similar recommendations in the future.

Vulnerabilities in one embodiment are assigned a unique identifier and stored in an association table that maps between vulnerabilities and the IDs of the component-versions that have those vulnerabilities. In one embodiment, synthetic keys are used for versions rather than the names of versions because the same version of a component may be called different things by different naming authorities such as the original author, the NVD, and numerous end-users.

In one embodiment, license module 114 performs 218 an analysis to identify any component-, version- or release-specific licensing policies stored in licensing database 118 that have application to any of the candidate files.

Finally, in one embodiment a report 112 is created 220, providing the results of the version detection analysis. The granularity of the report in one embodiment may be filtered to provide more or less information about the results that are found. Report 112 may include, for example, a list of all files found in target files 110, a list of all files in target files 110 that match any files in reference database 108, a list of all initial candidates components, versions and releases, and a list of final identified components, versions and releases. Report 112 may also include a list of any vulnerabilities or licensing arrangements known to be associated with any component, version or release.

The present invention has been described in particular detail with respect to a limited number of embodiments. Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware, firmware, or software. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for identifying software component versions on a file system the method comprising:
   scanning, by a computer, a plurality of target files to obtain content-based file identifiers;
   comparing, by the computer, each content-based file identifier to identifiers in a reference library to determine a plurality of candidate versions of software components, each candidate version corresponding to at least one of the content-based file identifiers;
   identifying a subset of candidate versions from the plurality of candidate versions as present on the file system by, for each candidate version in the plurality of candidate versions:
      determining, using the reference library, whether the content-based file identifiers uniquely identify the candidate version, a content-based file identifier uniquely identifying the candidate version responsive to the content-based file identifier matching an identifier in the reference library that is associated with the candidate version but is not associated with other candidate versions; and responsive to the content-based file identifiers uniquely identifying the candidate version, determining that the candidate version is present on the file system; and producing a report including the subset of candidate versions identified as present on the file system.

2. The method of claim 1, wherein the content based file identifiers comprise MD5 digests.

3. The method of claim 1, wherein the content based file identifiers comprise code fingerprints.

4. The method of claim 1, wherein determining that the candidate version is present on the file system further comprises:

determining whether a directory structure of the scanned target files matches a directory structure of at least one release of the candidate version; and responsive to the content-based file identifiers uniquely identifying the candidate version and the directory structure matching the at least one release of the candidate version, determining that the candidate version is present on the file system.

5. The method of claim 1, wherein producing a report comprises:

comparing the subset of candidate versions to a vulnerabilities database, the vulnerabilities database including vulnerability information for a plurality of versions of components; and producing a vulnerability report including vulnerability information for the subset of candidate versions based on the comparison.

6. The method of claim 1, wherein producing a report comprises:

comparing the subset of candidate versions to a licensing database, the licensing database including licensing information for a plurality of versions of components; and producing a licensing report including licensing information for the subset of candidate versions based on the comparison.

7. The method of claim 1, wherein determining that the candidate version is present on the file system comprises:

determining whether the content-based file identifiers uniquely identify at least one release of the candidate version; and responsive to whether the content-based file identifiers uniquely identify the candidate version and whether the content-based file identifiers uniquely identify the at least one release of the candidate version, determining that the candidate version is present on the file system.

8. The method of claim 1, wherein the reference library comprises a plurality of the identifiers, and:

wherein the plurality of candidate versions of software components are determined by comparing the content-based file identifiers to only a subset of the plurality of the identifiers in the reference library, and wherein the content-based file identifiers are determined to uniquely identify the candidate version by comparing the content-based file identifiers to all of the plurality of the identifiers in the reference library.

9. A computer program product for identifying software component versions on a file system, the computer program product comprising a non-transitory computer readable medium having computer executable code for performing the steps of:

scanning a plurality of target files to obtain content-based file identifiers;

comparing each content-based file identifier to identifiers in a reference library to determine a plurality of candidate versions of software components, each candidate version corresponding to at least one of the content-based file identifiers;

identifying a subset of candidate versions from the plurality of candidate versions as present on the file system by, for each candidate version in the plurality of candidate versions:

determining whether the content-based file identifiers uniquely identify the candidate version using the reference library, a content-based file identifier uniquely identifying the candidate version responsive to the content-based file identifier matching an identifier in the reference library that is associated with the candidate version but is not associated with other candidate versions; and responsive to the content-based file identifiers uniquely identifying the candidate version, determining that the candidate version is present on the file system; and producing a report including the subset of candidate versions identified as present on the file system.

10. The computer program product of claim 9, wherein the content based file identifiers comprise MD5 digests.

11. The computer program product of claim 9, wherein the content based file identifiers comprise code fingerprints.

12. The computer program product of claim 9, wherein determining that the candidate version is present on the file system further comprises:

determining whether a directory structure of the scanned target files matches a directory structure of at least one release of the candidate version; and responsive to the content-based file identifiers uniquely identifying the candidate version and the directory structure matching the at least one release of the candidate version, determining that the candidate version is present on the file system.

13. The computer program product of claim 9, wherein producing a report comprises:

comparing the subset of candidate versions to a vulnerabilities database, the vulnerabilities database including vulnerability information for a plurality of versions of components; and producing a vulnerability report including vulnerability information for the subset of candidate versions based on the comparison.

14. The computer program product of claim 9, wherein producing a report comprises:

comparing the subset of candidate versions to a licensing database, the licensing database including licensing information for a plurality of versions of components; and producing a licensing report including licensing information for the subset of candidate versions based on the comparison.

15. The computer program product of claim 9, wherein determining that the candidate version is present on the file system comprises:

determining whether the content-based file identifiers uniquely identify at least one release of the candidate version; and responsive to whether the content-based file identifiers uniquely identify the candidate version and whether the content-based file identifiers uniquely identify the at least one release of the candidate version, determining that the candidate version is present on the file system.

16. A system for identifying software component versions on a file system, the system comprising:
  a processor; and
  a non-transitory computer-readable medium having executable code, the executable code executed by the processor to perform steps of:
    scanning a plurality of target files to obtain content-based file identifiers;
    comparing each content-based file identifier to identifiers in a reference library to determine a plurality of candidate versions of software components, each candidate version corresponding to at least one of the content-based file identifiers;
    identifying a subset of candidate versions from the plurality of candidate versions as present on the file system by, for each candidate version in the plurality of candidate versions:
      determining whether the content-based file identifiers uniquely identify the candidate version using the reference library, a content-based file identifier uniquely identifying the candidate version responsive to the content-based file identifier matching an identifier in the reference library that is associated with the candidate version but is not associated with other candidate versions; and
      responsive to the content-based file identifiers uniquely identifying the candidate version, determining that the candidate version is present on the file system; and
    producing a report including the subset of candidate versions identified as present on the file system.

17. The system of claim 16, wherein determining that the candidate version is present on the file system comprises:
  determining whether a directory structure of the scanned target files matches a directory structure of at least one release of the candidate version; and
  responsive to the content-based file identifiers uniquely identifying the candidate version and the directory structure matching the at least one release of the candidate version, determining that the candidate version is present on the file system.

18. The system of claim 16, wherein producing a report comprises:
  comparing the subset of candidate versions to a vulnerabilities database, the vulnerabilities database including vulnerability information for a plurality of versions of components; and
  producing a vulnerability report including vulnerability information for the subset of candidate versions based on the comparison.

19. The system of claim 16, wherein producing a report comprises:
  comparing the subset of candidate versions to a licensing database, the licensing database including licensing information for a plurality of versions of components; and
  producing a licensing report including licensing information for the subset of candidate versions based on the comparison.

\* \* \* \* \*